US009575875B2

(12) United States Patent
Gaikwad et al.

(10) Patent No.: US 9,575,875 B2
(45) Date of Patent: Feb. 21, 2017

(54) COMPUTER IMPLEMENTED SYSTEM AND METHOD FOR INDEXING AND ANNOTATING USE CASES AND GENERATING TEST SCENARIOS THEREFROM

(71) Applicant: ZENSAR TECHNOLOGIES LTD., Maharashtra (IN)

(72) Inventors: Vijaykumar Gaikwad, Maharashtra (IN); Saurabh Manohar Bobde, Maharashtra (IN); Nupur Mittal, New Delhi (IN)

(73) Assignee: ZENSAR TECHNOLOGIES LTD., Maharashtra (IN)

( * ) Notice: Subject to any disclaimer, the term of this patent is extended or adjusted under 35 U.S.C. 154(b) by 386 days.

(21) Appl. No.: 14/336,522

(22) Filed: Jul. 21, 2014

(65) Prior Publication Data

US 2014/0331212 A1     Nov. 6, 2014

Related U.S. Application Data

(63) Continuation-in-part of application No. 13/401,065, filed on Feb. 21, 2012, now abandoned.

(30) Foreign Application Priority Data

Feb. 22, 2011     (IN) ............................ 489/MUM/2011

(51) Int. Cl.
*G06F 9/44*     (2006.01)
*G06F 11/36*    (2006.01)

(52) U.S. Cl.
CPC ................................. *G06F 11/3684* (2013.01)

(58) Field of Classification Search
CPC .................................................. G06F 11/3684
(Continued)

(56) References Cited

U.S. PATENT DOCUMENTS 3,518,413 A  *  6/1970  Holtey ..................... G06F 9/226
                                                   712/E9.006
6,378,088 B1     4/2002  Mongan
(Continued)

OTHER PUBLICATIONS

Blom, Johan, et al. "Specifying and generating test cases using observer automata." International Workshop on Formal Approaches to Software Testing. Springer Berlin Heidelberg, 2004. pp. 127-139.*

(Continued)

*Primary Examiner* — Satish Rampuria
(74) *Attorney, Agent, or Firm* — Muncy, Geissler, Olds & Lowe, P.C.

(57) ABSTRACT

A system and method for indexing and annotating use cases and generating test scenarios using in-memory processing from the corresponding use case model includes a use case model creator to create/build an in-memory use case model for the use cases created by a user; a predetermined structural format, according to which the steps of the use cases are organized by an editor; an indexer to appropriately index the steps of the use case(s) in the use case model; a generator which facilitates extraction of the indexed steps from the use case and identification of at least one ordered set in which the indexed steps can be assembled; and a test scenario generator to generate a test scenario having the indexed steps arranged according to the ordered set identified by an identifier and being validated by a validator according to pre-determined validation criteria.

9 Claims, 3 Drawing Sheets

(58) Field of Classification Search
USPC .............................. 717/124–135; 714/31–39
See application file for complete search history.

(56) References Cited

U.S. PATENT DOCUMENTS

| | | | | |
|---|---|---|---|---|
| 6,457,171 | B1* | 9/2002 | Mann | G06F 9/45504 717/134 |
| 6,516,295 | B1* | 2/2003 | Mann | G06F 9/455 703/26 |
| 6,671,874 | B1 | 12/2003 | Passova | |
| 6,701,514 | B1 | 3/2004 | Haswell | |
| 6,907,546 | B1* | 6/2005 | Haswell | G06F 11/3684 714/38.11 |
| 6,976,246 | B1 | 12/2005 | Rosaria et al. | |
| 7,587,636 | B2 | 9/2009 | Tillmann et al. | |
| 7,930,682 | B2 | 4/2011 | Murthy | |
| 2005/0144529 | A1* | 6/2005 | Gotz | G06F 11/3684 714/38.1 |
| 2006/0214948 | A1 | 9/2006 | Murthy | |
| 2008/0184206 | A1 | 7/2008 | Vikutan | |

OTHER PUBLICATIONS

Csallner, Christoph, and Yannis Smaragdakis. "Check'n'crash: combining static checking and testing." Proceedings of the 27th international conference on Software engineering. ACM, 2005. pp. 422-431.*

Xie, Tao, et al. "Symstra: A framework for generating object-oriented unit tests using symbolic execution." International Conference on Tools and Algorithms for the Construction and Analysis of Systems. Springer Berlin Heidelberg, 2005. pp. 365-381.*

Boyapati, Chandrasekhar, Sarfraz Khurshid, and Darko Marinov. "Korat: Automated testing based on Java predicates." ACM SIGSOFT Software Engineering Notes. vol. 27. No. 4. ACM, 2002, pp. 123-133.

Jeff Offutt and Aynur Abdurazik, Generating Tests from UML Specifications, Springer-Verlag Berlin Heidelberg 1999, pp. 416-429.

Bird, David L., and Carlos Urias Munoz. "Automatic generation of random self-checking test cases." IBM systems journal 22.3 (1983), pp. 229-245.

* cited by examiner

COMPUTER IMPLEMENTED SYSTEM AND METHOD FOR INDEXING AND ANNOTATING USE CASES AND GENERATING TEST SCENARIOS THEREFROM

This application is a Continuation-In-Part (CIP) application of U.S. patent application Ser. No. 13/401,065, which was filed on Feb. 21, 2012, which claims priority to Indian Patent Application No. 489/MUM/2011, which was filed in India on Feb. 22, 2011, and which are both herein incorporated by reference.

BACKGROUND OF THE INVENTION

Field of the Invention

The present disclosure relates to the generation of test scenarios during test designing in software testing. More particularly, the present disclosure envisages creating structured, indexed and annotated use cases and generating test scenarios therefrom.

Description of the Background Art

Software testing is a verification technique utilized in the software industry. Prior to testing software applications, it is necessary to identify test scenarios that accurately represent the behavioral characteristics of the software application to be tested. A test scenario is a well-defined collection of test cases which dictates the order in which test cases need to be executed in order to determine if a software application is working appropriately.

Testing software applications is a critical step in the application development lifecycle and appropriate coverage of the critical test scenarios is of prime importance. Test scenarios are used for determining the coverage of an application's specified requirements. Test scenarios may be identified either manually (by experienced Test Designers) or in some cases, using tools. Commonly used approaches include trying to generate/identify the test scenarios from an activity diagram.

Nowadays, with the advent of technology, testing systems that automatically execute test cases without any sort of manual intervention are available, but the creation of test cases demands human involvement and supervision. Manual creation of test cases requires application of human intelligence and deep understanding of the software application to be tested. The process of manual identification of appropriate test cases is often considered to be complicated and time consuming.

Use case modeling is a process of creating relevant use cases that correspond to a particular software application. Use cases are well established means for requirements elicitation and specification and modeling the behavior of a system from user's point of view. A use case is a scenario that describes the use of a system by a user to accomplish a certain goal. The user acts on the system by providing inputs to the system. A use case scenario is an ordered set of actions and responses that describes the interaction between the system and user(s) external to the system. Therefore a use case could be termed as an ordered collection of all the actors acting upon the system and their respective interactions with the system. Use cases are used in the process of software testing because of the below mentioned advantages:

use cases help capture the system's functional requirements from a user's perspective;

use cases provide for the active involvement of users in the process of requirements gathering;

use cases make it possible to identify major classes contained in a software application and also help in understanding the interrelationships between those major classes;

use cases are used as a foundation to create test scenarios or test cases;

since use cases are widely used as the basis for software development, utilizing use cases for the purpose of software testing provides a uniform notation and also promotes reusability of use cases; and since the same set of use cases are utilized for software development as well as software testing, test cases to test the system could be developed in parallel with the development of software application thereby enabling a shorter lifecycle;

While tests—identified by designing test cases (and creation of corresponding test scripts)—are to be executed to validate the software application's conformance to the use case's requirements, due to the typically large number of possible combinations of actions, input data values, etc. in a system, the number of tests that can be run are often limited based on practical considerations such as time or effort. For targeting optimal coverage of tests (that is, application flow paths) for an application, it is therefore important to identify the critical and important test scenarios.

One of the common approaches utilized to test software applications is use case model based testing approach. In case of use case model based testing approach a use case model accurately representing the actual characteristics and expected behaviors of the software application under test is created. Formal use case models created using the process of use case modeling are used as the basis to identify test scenarios. One example of such a model is the activity diagram, which is created using the well-known Unified Modeling Language (UML). Creation of activity diagram/model automatically from use cases is also possible, though, often this may be done manually.

Test scenarios are higher level abstraction of a set of functional steps that encapsulate a particular test. Test cases are a detailed variant of test scenarios and typically include test inputs, test data and expected test results. A typical test scenario typically includes one or more test cases. A test scenario therefore acts as a means to determine the scope of coverage corresponding to test cases. In case of business critical software applications, use cases are likely to be complex and an accurate determination of a critical set of test scenarios is deemed necessary for conducting efficient testing of the software application.

With advancements in modeling technology and with advancements available as far as the languages utilized for the purpose of creating models are concerned, attempts have been made to create systems that would analyze software requirement specifications/documents and automatically identify test related attributes including but not restricted to test criteria, test data, test case execution paths and test execution scripts, based on the structure of the requirement specifications/documents. With the availability of Unified Modeling Language (UML), the task of analyzing the structure associated with use case models has been simplified. Systems of the prior-art, which utilize the method of use case grammar based categorization, often do not succeed in identifying the relevant test scenarios because those systems use single pass lexical analysis. Moreover the systems that use single pass lexical analysis fail to perform many of the required complex optimizations thereby resulting in identifying test scenarios which do not provide an accurate representation of the concerned system's behavior.

Moreover, another disadvantage associated with using single pass lexical analysis systems to identify test scenarios is that those systems have no inbuilt structure to categorize the identified test scenarios and the lack of categorization of test scenarios is a major issue when numerous use cases are created in correspondence to a particular software application. The process of automatic identification of test scenarios based on the use case documentation is further complicated by the fact that use cases are documented using different formats such as Unified Modeling Language (UML) and Systems Modeling Language (SysML).

Some of the prior art systems for generating test cases are discussed below:

U.S. Pat. No. 7,930,682 granted to Siemens Corporation teaches a system and method for generating test frames in specification based testing by using a path coverage criterion. The method envisaged by the above mentioned US patent includes receiving a test design as input and constructing a context free grammar graph based on the test design. The method further includes analyzing the context free grammar graph to generate a first set of paths and emitting a set of test frames as output based on the first set of paths. The aforementioned patent envisages a system that accepts an ECFG (extended context free grammar) model based test design as an input to generate all possible test frames. The method advantageously reduces frequent back tracking with repeated random number generator overheads while systematically traversing a context free grammar graph of a test design.

U.S. Pat. No. 6,378,088 granted to John Thomas Mongan teaches a test generator that generates tests by randomly traversing description of the interface of a program being tested, thereby generating tests that contain randomly selected actions and randomly selected data. During the phase of execution, the tests generated in accordance with the above mentioned US patent manipulate the program being tested. The generated tests take the form of test scripts written in the language of a commercially available testing tool and include programming statements that invoke one or more functions of the application program being tested.

U.S. Pat. No. 6,671,874 granted to Sofia Passova teaches a method of developing a model of a computer program which represents the system requirement conditions and events as a set of positions and transitions, and maps the system requirements in a table as positions and optionally as transition designations. The method in accordance with the aforementioned US patent models the system requirements, design requirements and program code for a computer program.

U.S. Pat. No. 6,976,246 granted to Microsoft Corporation teaches a finite state model based testing system that has a user interface which enables a user to enter state information and transition information about a software application to be tested. The user interface further enables the user to initiate a model generation engine to generate a model of the software application based on the state information and transition information. The testing system further includes a graph traversal menu that enables the user to select a graph traversal program for the purpose of generating a test sequence of inputs for the software application from the state and transition information provided. The testing system further includes a test execution menu that enables the user to select a test driver program which reads the test sequence of inputs for the software application and executes the test sequence of inputs on the software application.

U.S. Pat. No. 6,701,514 granted to Accenture LLP envisages a system and method for test maintenance in an automated scripting framework. In accordance with this patent document, the system for test maintenance first develops plurality of test scripts that are then stored in centrally located database. A specific test script from the stored test scripts is then edited by a user, these user-edits of the specific test script are then propagated to the plurality of stored test scripts. The system as disclosed in this document uses database to store test scripts and test criteria. Based on the stored test criteria, relationship between the stored test script components is identified in order to develop test scenarios from the underlying relational database. Therefore, this system utilizes relational database functionality to combine test script component and develop test scenarios.

None of the Patent Documents mentioned above have addressed the issue of automatically generating test scenarios from indexed use cases which are unambiguous. Moreover, none of the above mentioned Patent Documents address the issue of processing use cases as inputs that are created using different formats such as UML and SysML. Therefore there is felt a need for a system that can appropriately index the steps in use cases and automatically identify relevant test scenarios based on the indexed use cases.

SUMMARY OF THE INVENTION

Some of the non-limiting objects of the present disclosure include the following:

An object of the present disclosure is to introduce consistency and reliability to the process of identifying test scenarios from use cases.

Yet another object of the present disclosure is to provide a system that will create structured indexed use cases.

One more object of the present disclosure is to provide a system which will automatically index structured use cases.

Yet another object of the present disclosure is to provide a system that would meaningfully organize the steps included in a use case in order to establish a semantic correlation between the steps of the use case.

Still a further object of the present disclosure is to provide a system that offers flexibility in terms of uniquely numbering the steps contained in a use case.

Another object of the present disclosure is to provide a system that enhances the clarity and reduces the ambiguity of input use cases.

Yet another object of the present disclosure is to provide a system that adds appropriate keywords at appropriate steps of the use case model to provide better understandability and clarity to the user.

Another object of the present disclosure is to automatically identify test scenarios based on the structured and indexed use case models.

Yet another object of the present disclosure is to provide a system which efficiently recognizes relevant test scenarios within a shorter span of time.

One more object of the present disclosure is to provide a system that identifies test scenarios directly from use case documentation thereby avoiding the creation of a test model.

Still further object of the present disclosure is to provide a system that identifies test scenarios by processing use case models that are created in different formats such as Unified Modeling Language (UML), and Systems Modeling Language (SysML). Yet another object of the present disclosure is to provide a system that can be easily integrated with the existing software development systems and software testing systems.

Another object of the present disclosure is to provide a system that reuses the artifacts from the earlier phases of software development process in the process of testing, thereby taking advantage of the synergy between the closely related phases of software development and software testing.

Other objects and advantages of the present disclosure will be more apparent from the following description when read in conjunction with the accompanying figures, which are not intended to limit the scope of the present disclosure.

The present disclosure envisages a computer implemented system for indexing and annotating steps associated with use cases and generating test scenarios therefrom. The system, in accordance with the present disclosure includes a processor and, a memory coupled to the processor for indexing and annotating steps associated with use cases and generating test scenarios, using at least one of a pre-configured rule set and a user configurable rule set. The system of the present disclosure also includes a use case model creator adapted to create/build at least one in-memory use case model of the use cases created by a user and store the use case model in the memory. The system, in accordance with the present disclosure includes a pre-determined structural format for the use cases. Further, the system includes an editor adapted to organize the steps associated with the use cases in the in-memory use case model according to the pre-determined structural format only in the event that the steps do not adhere to the pre-determined structural format. The steps that adhere to the pre-determined structural format and the steps re-arranged according to the pre-determined format are indexed by an indexer. At least one of these indexed steps in each of the use cases in the use case model is annotated by inserting appropriate keywords into at least one of the indexed steps by an annotating processor. The system further includes a generator adapted to receive use cases having indexed steps with or without annotation, wherein the generator includes an extractor adapted to extract the indexed steps from the in-memory use case model of the use cases. The generator further includes an identifier adapted to identify at least one ordered set in which the indexed steps can be assembled, wherein the ordered set includes at least one flow selected from the group of flows consisting of main flow, alternative flow and exception flow. The generator further includes a test scenario generator adapted to generate at least one test scenario having the ordered indexed steps arranged according to the ordered set identified by the identifier, the test scenario generator is further adapted to validate generated test scenarios based on a pre-determined validation criterion. The generator also includes a comparator adapted to compare generated test scenarios based on the order of the corresponding indexed steps; the comparator is further adapted to eliminate the test scenario having an ordered set identical to that of another generated test scenario.

The present disclosure envisages a computer implemented method for indexing and annotating steps associated with use cases and generating test scenarios therefrom. The method, in accordance with the present disclosure includes the steps of:

providing a computerized processing system comprising a memory coupled to a processor for indexing and annotating steps associated with use cases and generating test scenarios using at least one of a pre-configured rule set and a user configurable rule set;

creating at least one in-memory use case model from the user provided use case input and storing the use case model in the memory;

re-arranging the steps associated with the use case model corresponding to the use cases according to a pre-determined structural format only in the event that said steps do not adhere to said pre-determined structural format;

indexing the steps that adhere to said pre-determined structural format and the steps re-arranged according to said pre-determined structural format;

annotating the indexed steps in each of said use cases in the in-memory use case model by inserting appropriate keywords into at least one of the said indexed steps;

receiving the use cases in the in-memory use case model having indexed steps and extracting said indexed steps from said use cases;

identifying at least one ordered set in which said indexed steps can be assembled;

generating at least one test scenario having the assembled and ordered indexed steps arranged according to the identified order;

validating generated test scenarios based on a pre-determined validation criterion; and comparing generated test scenarios based on the order of corresponding indexed steps and eliminating the test scenario having an ordered set identical to that of another generated test scenario.

BRIEF DESCRIPTION OF THE DRAWINGS

The disclosure will now be described with reference to the accompanying drawings, in which.

DETAILED DESCRIPTION

The term 'main flow' in an exemplary embodiment can refer to the set of use case steps that describe the most common way the use case executes normally (that is, successfully). The main flow contains the most preferred order of steps describing the interactions between the system under test and user.

The term 'alternative flow' in an exemplary embodiment can refer to the set of use case steps that describe the scenarios other than the ones that have been described through the main flow. The term alternative flow is used to represent an alternative order of steps describing the alternative interactions between the system under test and user.

The term 'exception flow' in an exemplary embodiment can refer to the set of steps taken by the system described by the use case when abnormal conditions occur. The term exception flow normally represents a path that is undesirable to the user, such as an error condition or unexpected response from the system for the user's action.

The term 'in-memory' in an exemplary embodiment can refer to the random access memory and/or flash memory on which data and instructions to be processed are loaded.

The block diagrams and the description thereto are merely illustrative and only exemplify the computer implemented system and method for indexing and annotating steps associated with use cases and generating test scenarios therefrom, envisaged by the present disclosure and in no way limit the scope thereof.

To overcome the difficulties associated with creating indexed and annotated use cases and generating relevant test scenarios therefrom, the present disclosure provides a system that indexes and annotates use cases and facilitates generation of test scenarios therefrom. The system in accordance with the present disclosure appropriately establishes semantically correlated indexes for the steps associated with the use case. The system inserts appropriate keywords including but not restricted to break, continue and stop at appropriate junctures of the use case in order to be processed as hints to the test scenario generator during test scenario generation.

Figure 1:
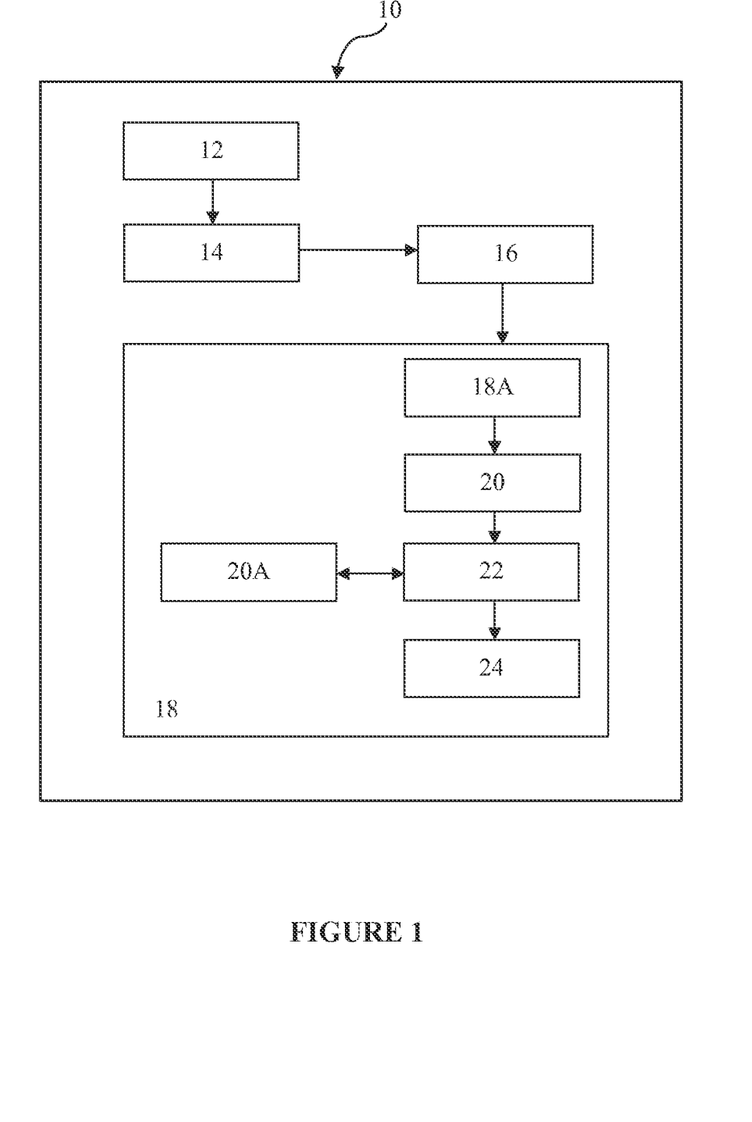
FIG. 1 illustrates a schematic of the computer implemented system for creating indexed, annotated use cases and generating test scenarios therefrom.

Referring to the accompanying drawings, FIG. 1 illustrates a block diagram of the system 10 for indexing and annotating use cases and generating test scenarios therefrom. The system 10 acts as a framework for creating indexed and annotated use cases and identifying appropriate test scenarios therefrom. The system 10 in accordance with the present disclosure includes a use case creator (not shown in the figures) which makes use of known modeling techniques and functional requirements specified by the user to create use case models. In one embodiment, a user may use modeling tools in order to create a UML-based use case model, including the documentation for the associated use cases. Tools such as IBM Rational Software Modeler can be used for the same. However, models created using said tools provide a visual model of the use case. The system 10 in accordance with the present disclosure receives the use case documentation to create an in-memory use case model.

In accordance with the present disclosure, the created use case model describes the complete functionality of a software application under consideration by identifying how everything that is outside the software application interacts with it. The use case model contains one or more use cases representing the individual interactions between the software application under consideration and the users of the software application. Typically, the procedure for creating a basic use case involves identifying all the users using the software application under consideration. During the process of creation of the use case all the users are identified and the roles played by the identified users are appropriately documented.

The step of identification of users and determination of the roles played by the users is followed by the step of determination of application-related events that occur in the software application under consideration. The occurrence of events is dependent on the functionalities offered by the software application. The step of identification of events corresponding to the software application is followed by the step of determination of inputs, results and outputs corresponding to the software application. The step of determination of inputs, outputs and results corresponding to the software application is typically followed by the step of determining the steps of the main flow, alternative flow and exception flow corresponding to the software application under consideration.

The main flow, also termed as the basic flow of a use case describes a single path through the software application under consideration. It represents the most common way that the use case plays out successfully and contains the most popular order of user-software application interactions. Other scenarios or paths corresponding to the software application are described in combination with alternative flows and exception flows.

An alternative flow describes a scenario other than the main flow that results in a user completing his or her goal. It is often considered to be an optional flow and implies that the user has chosen to take an alternative path through the system. An exception flow is an unintended or unexpected path through the software application usually as a result of missing information or application errors. Exception flows represent an undesirable path to the user. However, even though the exception flow has occurred, the software application will ideally react in a way that recovers the flow and provide some useful information to the user. One of the major benefits of utilizing exception flows in a use case document is the focus that exception flows bring to error conditions. By capturing all of the ways that the software application can fail or produce an error, ways of mitigating the effects of the occurrence of application errors can be identified and worked upon and also the possibility of occurrence of application errors can be minimized. Including alternative and exception flows in the use case model helps testers to incorporate tests corresponding to these paths, and thus improve the quality of the software system by validating the system behavior under these conditions.

The system 10, in accordance with the present disclosure, includes a use case model creator (not shown in the diagram) that creates/builds a use case model from the use case details given by the user, wherein the use case model is an in-memory data model that includes at least one use case. The system 10 also includes an editor denoted by the reference numeral 12 which receives the use case model from the use case model creator and processes the use cases contained in the use case model to determine whether the steps associated with each of the use cases adhere to a pre-determined structural format. In one embodiment the processing by editor 12 is carried out entirely in-memory. In another embodiment, the editor 12 may use temporary repository within the system 10. The editor 12 in accordance with the present disclosure retrieves one use case at a time from the use case model and checks the steps associated with the use case in order to determine whether the steps associated with the use case adhere to a pre-determined structural format.

In accordance with the present disclosure, a structured use case will have all the possible main flows, alternative flows and exception flows listed in a sequential order, i.e. all the possible main flows are listed first, followed by the alternative flows. The listing of alternative flows is followed by the listing of exception flows. However, it is possible that a use case might contain a complicated combination of flows, for example, an alternative flow might have a plurality of corresponding alternative flows or an alternative flow could have a plurality of corresponding exception flows. However, for the sake of brevity such examples have not been considered herein. However, the system 10 of the present disclosure is adapted to index and annotate use cases, and generate test scenarios therefrom, irrespective of their underlying complexity.

In accordance with the present disclosure, if the use case is found not to adhere to the pre-determined structural format, the editor 12 re-arranges the steps in the in-memory use case model, in order to establish a semantic correlation between the steps of the use case, only in the event that the steps of the use case do not adhere to the pre-determined structural format. By rearranging the steps associated with the use case, the editor 12 provides the use case with a proper and meaningful, yet non-indexed structure. When the steps of the use case are re-arranged by the editor 12, the use case model containing the use case is subsequently updated to reflect the changes that are performed on the use case. During the phase of re-arranging the steps of the use case, the steps associated with main flow(s) of the use case are firstly arranged according to a pre-determined structural format. Subsequently, the steps associated with alternative flow(s) are organized as per the pre-determined structural format so as to correspond to the relevant main flow in the use case. Additionally, the steps associated with the exception flows are arranged as per the pre-determined structural format so as to correspond with the corresponding main flow or the alternative flow so that the entire use case obtains a uniform structure and a well-defined format.

In accordance with the present disclosure, the use case whose main flow steps, alternative flow steps and exception flow steps have now been organized according to the pre-determined structural format is forwarded to an indexer 14. It is possible that none of the steps of a use case adhere to the pre-determined structural format or all the steps of the use case adhere to the pre-determined structural format or only few of the steps of the use case adhere to the pre-determined structural format. In the event that none of the steps of the use case adhere to the pre-determined structural format, all the steps would be re-arranged according to the pre-determined structural format by the editor 12. In the event that all the steps of the use case adhere to the pre-determined format, the steps of the use case are forwarded to the indexer 14. In the event that only few of the steps of the use case document do not adhere to the pre-determined structural format, such steps would be re-arranged and uniformly merged with the steps that adhere to the pre-determined structural format so as to provide uniformity and clarity to the use case.

The indexer 14 in accordance with the present disclosure is adapted to appropriately and semantically index the steps associated with the received use case. However, it is within the scope of the present disclosure to index the steps associated with the main flow, alternative flow and exception flow of the use case at the time of creating those use case steps, The indexer 14 uses a structure denoted as (p, c) wherein 'p' is the parent-index number. The parent index number 'p' represents the step number of the main flow with which the alternative flow is associated. 'c.x' represents the child index number wherein 'c' represents the number corresponding to the alternative flow and 'x' represents the corresponding step of the alternative flow, i.e., if p=2; c=1.1 and x=a then 'c=1' denotes the first alternative flow; 'p=2' denotes that the alternative flow corresponds to the second step of main flow; and 'x=a' denotes the first step of first alternative flow and the range [a . . . z] is utilized to denote the subsequent steps in the alternative flow. Therefore, if a use case step is indexed by the indexer 14 as '2.1.a' then it denotes that the step having such an index is the 'first' step (x=a) of the 'first' alternative flow (c=1) corresponding to the second step of main flow (p=2). However, the variable 'x' need not be used in cases where the alternative flow has only one step. For example, in case of an alternative flow having only one step the notation '2.1' and '2.1.a' may be deemed equivalent. The steps associated with the main flow, alternative flow and exception flow of the use case can be indexed at the stage of creating the use case. The steps of the use case indexed according to the aforementioned phenomenon by the indexer 14 are forwarded to the annotation processor 16 which is adapted to annotate at least one of the indexed steps of each of the use cases from the in-memory use case model. The annotation processor 16 is adapted to annotate the indexed steps by inserting appropriate keywords including but not restricted to 'break', 'goto', 'continue', 'stop' and 'start' at appropriate indexed steps in the use case to provide more clarity and understandability to the use case and in turn, 'hints' to the test scenario generator.

In one embodiment, the annotation processor 16 includes an annotation editor (not shown in the figure) that annotates the indexed steps automatically based on either pre-defined fixed set of annotating rules or configurable set of annotating rules stored in a repository (not shown in the figure). For this, the annotating processor 16 accesses the in-memory indexed data structure to find the step corresponding to the step where the annotation needs to be inserted and/or modified, and updates the in-memory structured and indexed data. In another embodiment, the annotation processor 16 allows a user to manually add the annotations and then check if the added annotations comply with the pre-defined set of annotating rules.

In accordance with the present disclosure, the use cases contained in a use case model are sequentially retrieved and appropriately indexed and annotated in order to provide them with a well-defined structure. The indexed and annotated in-memory use case model thus created is further passed on to a generator 18 which includes an extractor denoted by the reference numeral 18A which is adapted to extract the indexed and annotated steps from the in-memory use case model received by the generator 18. It is to be noted that all the steps of the use case will be indexed by the indexer 14 whereas only appropriate indexed steps would be annotated by the annotation processor 16. Therefore, it is to be understood that every indexed step might not have a corresponding annotation. The indexed steps extracted by the extractor 18A are collected into a temporary, in-memory data structure and are then forwarded to an identifier denoted by the reference numeral 20 which is adapted to identify at least one ordered set in which the indexed steps of the use case model could be organized, to be logically traversed as part of a corresponding test case.

The ordered set identified by the identifier 20 includes at least one flow selected from the group of flows consisting of main flow, alternative flow and exception flow. When the indexed steps of the use case are accessed by the identifier 20, the identifier 20 systematically processes the set of indexed steps to typically determine a starting point for the ordered set in a pre-determined order. The ordering of the steps in the set typically begins at the starting point defined by the use case. Normally, the order of traversal is initiated with processing of the indexed steps corresponding to the main flow of the use case. Firstly the indexed steps corresponding to the main flow of the use case will be traversed. Subsequent traversals of the use case are based on the presence of the corresponding alternative flow steps and exception flow steps. If the use case includes any alternative flows corresponding to the main flow, then subsequent to the traversal of the steps of the main flow, the steps corresponding to the alternative flow will be traversed. Subsequently, if it is determined by the identifier 20 that exception flows corresponding to one or more steps of the main flow are included in the use case then, the step(s) corresponding to the exception flows would be traversed. Each combination or the ordered steps are identified by the identifier 20 and collected into an in-memory data structure to represent a test scenario for the use case containing the indexed steps. In one embodiment, the identifier 20 can be adapted to identify the values for each data variable included in the use case. The data variables utilized along a particular traversal order are also derived from the use case.

In accordance with the present disclosure, the order of traversal identified by the identifier 20 includes but is not restricted to:

1. Basic-Main Path scenario: in this scenario, the ordered set identified by the identifier 20 includes only a main flow and no alternative flows and exception flows are present.

2. Basic-Exception Path scenario: in this scenario, the ordered set identified by the identifier 20 includes at least one main flow followed by the corresponding exception flows.

3. Alternative Path Scenario: in this scenario, the ordered set identified by the identifier 20 includes at least a first main flow followed by alternative flows corresponding to the first main flow, followed by a second main flow.

4. Alternative with Exception Path scenario: in this scenario, the ordered set identified by the identifier 20 includes a first main flow followed by corresponding alternative flows further followed by the corresponding exception flows.

The identifier 20 in accordance with the present disclosure cooperates with a test scenario generator 22 which is adapted to generate at least one test scenario having the indexed steps arranged according to an order identified by the identifier 20. The test scenario generator 22 is further adapted to validate the generated test scenarios based on pre-determined validation criteria. The test scenario generator 22 validates the generated test scenarios based on pre-determined validation criteria which include but are not restricted to adequacy of the data utilized in the use case, the flow of information, coverage of interaction between the user and the application to be tested and keywords specified. i.e., for example if an ordered set includes a main flow and two corresponding alternative flows, and if the keyword 'break' is specified as the validation criterion, then the ordered set gets updated by the test scenario generator 22 and is represented as 'main flow' followed by the 'alternative flow' followed by the keyword 'end' denoting the fact that the test scenario ends with the alternative flow. Validating prevents inconsistent or illogical test scenario steps. In one embodiment the validation step includes steps of checking/unchecking the wanted/unwanted steps based on user input using a user interface so as to include/exclude steps in the required test scenario. Validating ensures consistency and repeatability to the outcome. In one embodiment, the updated set of identified and validated test scenarios is displayed to the user via a display device including a monitor.

In accordance with the present disclosure, the test scenario generator 22 further includes a comparator 22A (not shown in the figure) which is adapted to identify and eliminate duplicate test scenarios from the set of generated test scenarios. For example, if a first test scenario has main flows and exception flows similar to a second test scenario with the only distinction being that the second test scenario has a set of alternative flows along with the main flow and the exception flow, in the event that the alternative flow is completely deleted from the second test scenario then both the first and second test scenario would have a similar flow structure. In case of occurrence of such a condition, in case of deletion of alternative flows from the second test scenario, the test scenario generator 22 identifies that the two test scenarios, i.e., the first test scenario and the second test scenario have exactly similar flow structure and subsequently excludes the second test scenario.

The system 10 in accordance with the present disclosure further includes an exporter denoted by the reference numeral 24 which exports the generated test scenarios including the validated test scenarios to a test management environment. The test management environment can include a computer connected to a network wherein the process of creating a test suite and managing the testing cycle (process) of software applications is undertaken. The test management environment can also include a computer located in a remote location to which the exporter 24 can be plugged in order to facilitate transfer of relevant test scenarios. Alternatively, the exporter 24 can also export the generated test scenarios wherein they can be stored for further utilization. Typically, the generated test scenarios are exported in formats including MS Excel or text format by the exporter 24.

Figure 2:
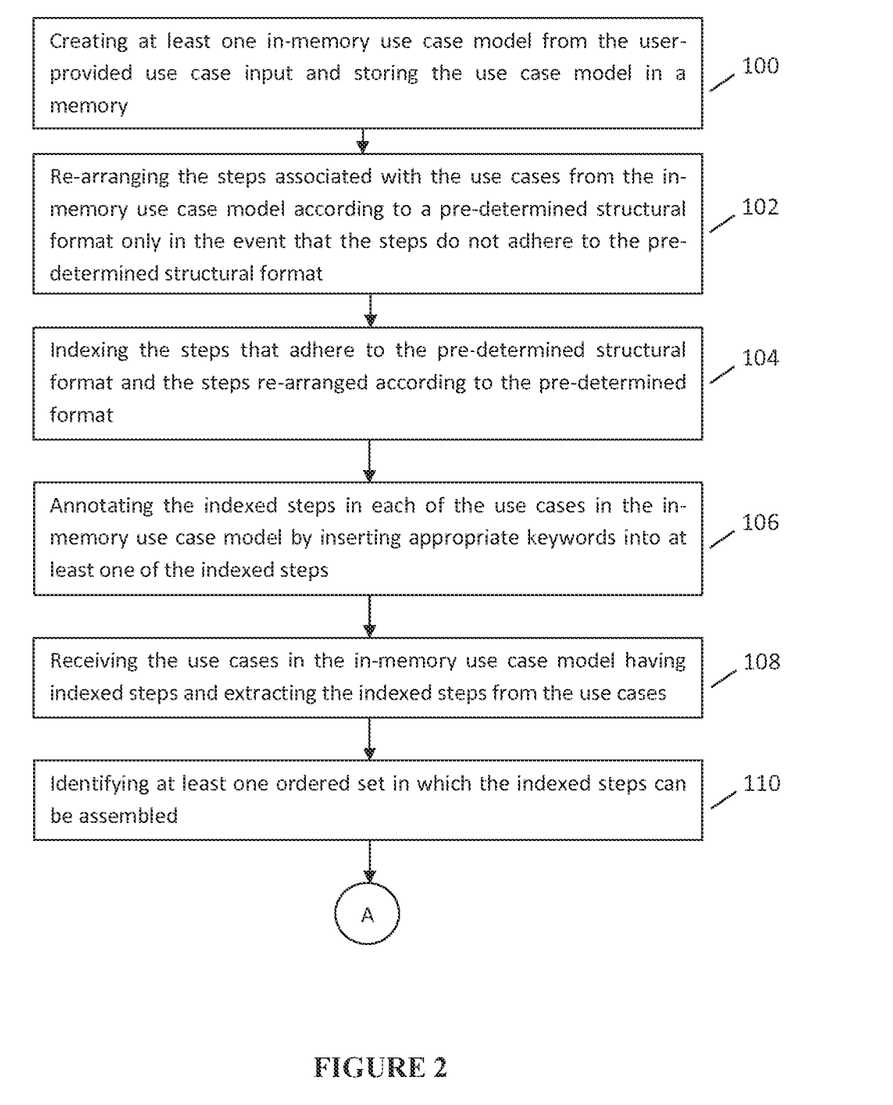
FIG. 2 and FIG. 3 illustrate flowcharts for the computer implemented method for creating indexed, annotated use cases and generating test scenarios therefrom.
Figure 3:
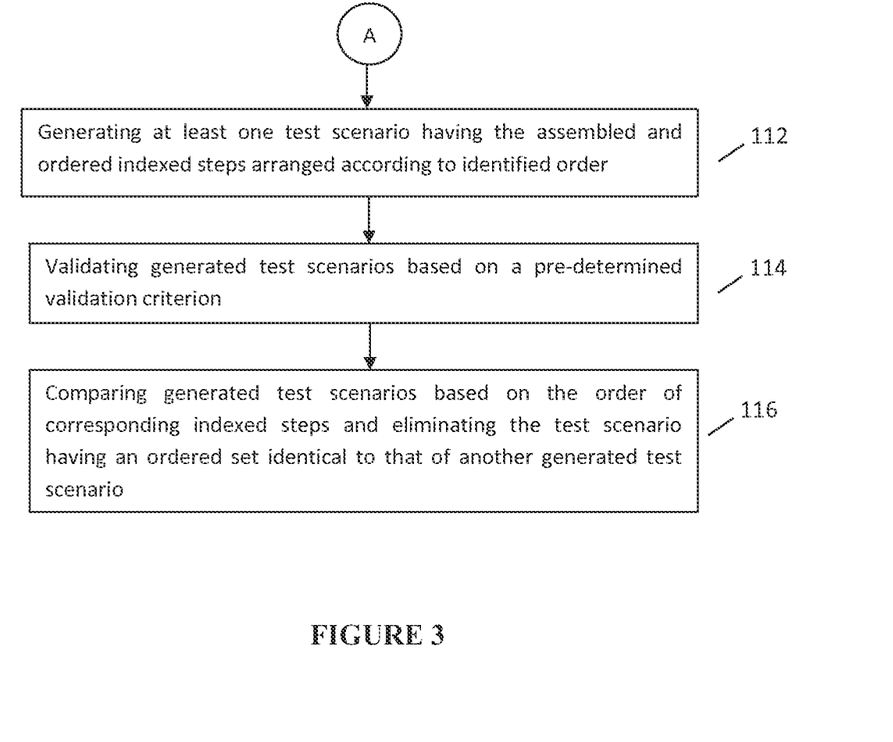

Referring to FIG. 2 and FIG. 3, there is illustrated a method for indexing and annotating use cases and generating test scenarios therefrom. The method envisaged by the present disclosure includes the following steps:

creating at least one in-memory use case model from the user-provided use case input and storing the use case model in a memory 100;

re-arranging the steps associated with the use cases from the in-memory use case model according to a pre-determined structural format only in the event that said steps do not adhere to said pre-determined structural format 102;

indexing the steps that adhere to said pre-determined structural format and the steps re-arranged according to said pre-determined format 104;

annotating the indexed steps in each of said use cases in the in-memory use case model by inserting appropriate keywords into at least one of the said indexed steps 106;

receiving the use cases in the in-memory use case model having indexed steps and extracting said indexed steps from said use cases 108;

identifying at least one ordered set in which said indexed steps can be assembled 110;

generating at least one test scenario having the assembled and ordered indexed steps arranged according to identified order 112;

validating generated test scenarios based on a pre-determined validation criterion 114; and comparing generated test scenarios based on the order of corresponding indexed steps and eliminating the test scenario having an ordered set identical to that of another generated test scenario 116.

In accordance with the present disclosure, the step of identifying at least one ordered set further includes the step of identifying an order having at least one flow selected from the group of flows consisting of main flow, alternative flow and exception flow.

In accordance with the present disclosure, the method further includes the step of exporting at least the generated test scenarios including validated test scenarios into a test environment.

In accordance with an exemplary embodiment of the present disclosure, there is shown a use case pertaining to the process of "cash withdrawal" by a customer from the "ATM of a bank". In a software development life cycle, the below mentioned use case is also used for the purpose of testing the software application underlying the "cash withdrawal" operation of an automatic teller machine (ATM). Table 1.1 given below exemplifies the use case document. However, it is to be understood that other fields for each use case may be included without departing from the scope of the disclosure. Typically, the procedure for creating a basic use case involves identifying all the actors who act on the software application under consideration. The word 'actor' is used to depict the role played by the user who interacts with the software application under consideration. During the process of creation of the use case, all the actors/users are uniquely identified and appropriately documented. The step of determination of actors is followed by the step of determination of events that occur across the system of the application under consideration. The occurrence of events is dependent on the functionalities of the software application or system. The step of identification of events corresponding to the software application is followed by the step of determination of inputs, results and outputs corresponding to the software application. The step of determination of inputs, outputs and results corresponding to the software application is normally followed by the step of determining the main flow, alternative flow and exception flow corresponding to the software application under consideration.

TABLE 1.1

Actors

Bank Customer
Bank
Preconditions

The automatic teller machine of the bank must be connected through a network.
The automatic teller machine must have dispensable cash.
Main Flow The use case begins when Bank Customer inserts their Bank Card.
Customer enters his credentials when prompted by the ATM
Use Case named "Validate User" (not shown) is executed.
The ATM displays the different alternatives that are available on this unit.
The ATM prompts for an account.
The Bank Customer selects an account.
The ATM prompts for an amount.
The Bank Customer enters an amount.
Card ID, PIN, amount and account is sent to Bank as a transaction. The Bank Consortium replies with a go/no go reply telling if the transaction is ok. Then money is dispensed.
The Bank Card is returned.
The receipt is printed.
The use case ends successfully.
Alternative Flows
Amount Exceeds Withdrawal Limit If in the eighth step "Bank Customer enters an amount" in the main flow, the Bank Customer enters an amount that exceeds the withdrawal limit, then the ATM displays a warning message, and asks the Bank Customer to re-enter the amount. The use case resumes execution at step 8 of main flow.
Invalid User If in third step of the main flow, if the use case named "Validate User" does not successfully execute, an exception will be raised and an error log will be created by ATM. If this is the last permissible attempt (for example, third attempt), then exception flow "Lock User" will be executed, Else, the use case resumes execution at step 2 of main flow.
Invalid account If in step 9 of the main flow the account selected by the Bank Customer is not associated with the inserted bank card, then the ATM shall display the message "Invalid Account - please try again". The use case resumes execution at step 5 of main flow.
ATM Out of cash If in step 9 of the main flow, the ATM machine is out of cash to dispense, the use case ends with a failure condition, an exception will be raised and an error log will be created by the ATM. The use case resumes at step 10 of the main flow.
Exception Flow
Lock User If in alternative flow "Invalid User", the user has exceeded the allowed number of attempts, an error log will be created by the ATM, and the card will not be returned. The use case resumes at step 11 of the main flow.
Printer Fault If in step 11 of the main flow, the ATM machine is out of paper or the receipt printer fails for any reason, the use case ends with a failure condition, an exception will be raised and an error log will be created by the ATM.

The use case provided in Table 1.1 is structured but non-indexed. The above mentioned use case in spite of having a structure lacks proper indexing and annotations. In a traditional context (approach/environment), the use case is created using the commonly available document editing tools such as Microsoft Word, while in some other cases a more formalized, UML-based use case modeling may be used. However, use cases in such a manner need to be processed by the human expert to derive and identify the test design corresponding to it.

The system 10 with reference to FIG. 1 envisaged by the present disclosure receives the use case model and processes the use cases contained in the use case model to determine whether the use cases are in a structured format or an unstructured format and also allows the user to edit the use case, if needed. The system 10 includes an editor 12 that organizes the steps of the use case in accordance with the pre-determined structural format comprising main flows, alternative flows and exception flows. Additionally, the use cases in this structured form are indexed by an indexer 14 of the system 10. Table 1.2 given below exemplifies the use case after it has been formatted according to the pre-determined structural format and indexed to establish the semantic correlation between the steps of the use case.

TABLE 1.2

Actors

Bank Customer
Bank
Preconditions

The automatic teller machine of the bank must be connected through a network.
The automatic teller machine must have dispensable cash.
Main Flow 1. The use case begins when Bank Customer inserts their Bank Card.
2. Customer enters his credentials when prompted by the ATM
3. Use Case named "Validate User" (not shown) is executed.
4. The ATM displays the different alternatives that are available on this unit.
5. The ATM prompts for an account.
6. The Bank Customer selects an account.
7. The ATM prompts for an amount.
8. The Bank Customer enters an amount.
9. Card ID, PIN, amount and account is sent to Bank as a transaction. The Bank Consortium replies with a go/no go reply telling if the transaction is ok. Then money is dispensed.
10. The Bank Card is returned.
11. The receipt is printed.
The use case ends successfully
Alternative Flows
3.1 Invalid User

[If in step 3 of the main flow,] if the use case named "Validate User" does not successfully execute, an exception will be raised and an error log will be created by ATM. If this is the last permissible attempt (For Example, third attempt), then exception flow "Lock User" will be executed,
STOP
Else, the use case resumes execution at step 2 of main flow.
8.1 Amount Exceeds Withdrawal Limit

[If in the step 8: "Bank Customer enters an amount" in the main flow], the Bank Customer enters an amount that exceeds the withdrawal limit, then the ATM displays a warning message, and asks the Bank Customer to re-enter the amount. The use case resumes execution at step 8 of main flow.
9.1 Invalid account If [in step 9 of the main flow] the account selected by the Bank Customer is not associated with the inserted bank card, then the ATM shall display the message "Invalid Account - please try again". The use case resumes execution at step 5 of main flow.
9.2 ATM Out of cash If [in step 9 of the main flow,] the ATM machine is out of cash to dispense, the use case ends with a failure condition, an exception will be raised and an error log will be created by the ATM. The use case resumes execution at step 10 of main flow.

TABLE 1.2-continued

Exception Flow
3.1 Lock User

If in alternative flow "Invalid User", the user has exceeded the allowed number of attempts, an error log will be created by the ATM, and the card will not be returned. The use case resumes at step 10 of the main flow.
11.1 Printer Fault If in step 11 of the main flow, the ATM machine is out of paper or the receipt printer fails for any reason, the use case ends with a failure condition, an exception will be raised and an error log will be created by the ATM.
STOP Table 1.2 illustrates a structured and indexed use case. The indexed use case illustrated in Table 1.2 clearly describes various aspects of the use case document such as the main flow, alternative flow and exception flow amongst others. Moreover, the use case shown in Table 1.2 also includes appropriately indexed items which bring clarity and understandability to the use case. As shown in table 1.2, various process steps depicted in the use case have been appropriately indexed using a number series by the indexer 14, and the use case has been edited by the editor 12 in accordance with the pre-determined structural format comprising main flow, alternative flows and exception flows, in order to enhance the readability and clarity of the use case. Further, certain steps in the use case flows have been annotated by keywords like "STOP" to enhance the clarity of the requirements for the expected system's behavior. Such behavior is the subject of the test design that aims to ensure correctness under the stated conditions and scenarios.

In accordance with the present disclosure, the indexed and annotated use case, as exemplified in Table 1.2 is provided as input to an identifier 20. The identifier 20 is adapted to identify the set of all possible orders of traversals corresponding to the indexed and annotated use cases. The ordered set identified by the identifier 20 includes at least one main flow, corresponding alternative flow(s) and corresponding exception flow(s). However, it is possible in some cases that the exception cases may not be present.

The identifier 20 begins processing the use case typically from a start point defined by the use case. Normally, the order of traversal is initiated with the processing of the indexed steps corresponding to the main flow of the use case, and as per Table 1.2, the processing of the use case begins with the processing of Main Flow which begins with the step of bank customer inserting his/her card. Subsequently, all the steps included in the main flow will be processed by the identifier 20. Subsequent traversals of the use case are based on the presence of the corresponding alternative flow steps and exception flow steps. If the use case includes any alternative flows corresponding to the main flow, then subsequent to the traversal of the steps of the main flow, the steps corresponding to the alternative flow will be processed. In case of Table 1.2, the described use case includes four alternative flows indexed as 3.1, 8.1, 9.1 and 9.2 respectively. Therefore, subsequent to the processing of the main flow, the aforementioned alternative flows would be processed along with the steps of the main flow from the in-memory data structure for this use case model to arrive at a candidate test scenario comprising the main flow and the corresponding alternative flows.

For example, a use case with main flow and alternative flows could be traversed in such a manner that the corresponding candidate test scenario includes the following sets of steps:

Set 1: {1,2,3,4,5,6,7,8,9,10,11-END}, wherein steps 1,2, 3 . . . 11 correspond to the steps in the main flow (this order represents the normal flow); and {1,2,3.1-STOP}, wherein steps 1 and 2 correspond to the steps in the main flow and step 3.1 corresponds to the alternative flow (this order represents the combination of normal flow and corresponding alternative flow).

For example, another candidate test scenario could include the following set of steps:

Set 2: {1,2,3,4,5,6,7,8,9,10,11-END}, wherein steps 1,2, 3 . . . 11 correspond to the steps in the main flow; and {1,2,3,4,5,6,7,8.1.-STOP}, wherein steps 1,2,3,4,5,6 and 7 correspond to the steps in the main flow and step 8.1 corresponds to the alternative flow;

In accordance with this disclosure, set 1 and set 2 correspond to the possible candidate test scenarios generated by traversing the main flow and corresponding alternative flows. It is to be noted that for the sake of explanation only two sets of identified test scenarios are illustrated here. However, for the aforementioned exemplary use case, the number of test scenarios that can be identified will be up to 24, and all the possible test scenarios have not been explained for the sake of brevity.

Subsequent to the traversal of the main flow and alternative flows, if it is determined by the identifier 20 that exception flows corresponding to one or more steps of the main flow are included in the use case, then the step(s) corresponding to the exception flows in the in-memory use case model would be traversed. In case of the use case depicted in Table 1.2 two exception flows indexed as 3.1 and 11.1 have been provided. Therefore, the steps of the exception flows would be traversed by the identifier 20 subsequent to the traversal of the main flow and the alternative flows.

In case of Table 1.2, for example, the steps of the alternative flow corresponding to the $9^{th}$ step of the main flow are identified as alternative flow 9.1 and 9.2 such an identification of the alternative steps corresponding to a particular main step is performed by the identifier 20 based on the index associated with the steps of the alternative flow.

In accordance with the present disclosure, since steps of alternative flows 9.1 and 9.2 have been indexed beginning with the numerical '9' (in the format 9.x.x), the identifier 20 identifies that these steps correspond to the $9^{th}$ step of the main flow. Subsequently, the steps identified by the identifier 20 will be arranged in terms of an ordered set (order involving a particular step of the main flow, all the steps of the alternative flows which have been identified as related to the particular steps of the main flow) so as to represent a meaningful flow.

Further to processing the indexed and annotated use case and determining the main flow, alternative flows and exception flows associated with the indexed and annotated use case, the identifier 20 identifies all the possible ordered sets in which the steps associated with the aforementioned flows can be assembled. A test scenario generator 22 which is adapted to generate test scenarios having indexed and annotated steps cooperates with the identifier 20 and generates test scenarios having indexed steps arranged according to the order identified by the identifier 20. The test scenario generator 22 acts as a consistent and reliable part for identifying and generating the possible test scenarios from the use case. The test scenarios thus identified are available to the test designer/analyst to proceed with the next stage of test designing (typically, test case preparation), and may be exported into a convenient format such as Microsoft Excel spreadsheet.

In accordance with another exemplary embodiment of the present disclosure, a use case corresponding to the process of "Viewing an online shopping cart" by a signed-in user, at an online shopping/e-commerce site for a retailer is shown. In a software development life cycle, the below mentioned use case is also used for the purpose of validating the software web application underlying the "online shopping and buying" operation of items such as books, music CDs and the like. The example below relates to the online purchase of software items. Table 2.1 given below exemplifies the use case document.

TABLE 2.1

Actors

Online Shopper (Customer)
Online Shopping web application (i.e. the system)
Preconditions The shopper is authorized and logged-in to the system
The shopper has selected available items/products from the listing (catalogue) and added these items to the shopping cart/basket and before proceeding to checkout, clicks the 'View Cart' menu option to review selected items. Some items may be available for "Try before Buy" i.e. trial or evaluation items, which may be priced at zero units of currency. A user may choose a combination of trial and non-trial (for example, paid) items.
Main Flow 1. The View Cart screen is displayed in the user's browser window, populated based on the selection of feature details.
The Fields are:
a. Feature Name
b. Subscription Type
c. Unit Period
d. Quantity (No. of Copies)
e. Price
2. If all trial feature details are selected (Total Cost = 0) then Checkout button will appear. Else if (Total Cost >0) Proceed to Checkout button will appear.
3. The screen will provide the following options to the user for the selected items in the cart:
a. update the quantity (quantity >0)
b. remove an item from the cart
4. The user reviews the list of selected items in the shopping cart.
5. If satisfied, the user clicks on the 'Checkout' or 'Proceed to Checkout' button to process to checkout. Else, the user may update an item, remove an item or return to select more items (Note: see alternative flows below for details)
6. The System generates the subscription key.
Explanatory note:

A subscription key is a key to unlock certain items for use by the shopper, and is generated by the system, once all parts of the purchasing transaction are validated and authorized.
7. If checkout for trial items is successfully complete, system displays a confirmation message ("Thank you for your subscription . . . ").
The use case ends successfully.
8. If checkout includes all paid, or a mix of trial and paid items, system displays a message ("You are being re-directed to the payment gateway to complete the payment for your transaction . . . "). The use case continues at the "Proceed to Payment" use case (not shown herein)
Alternative Flows:

Alternative Flow A: Updating Particular subscription item
A.1.1 The user selects the new quantity corresponding to the subscription item.
A.1.2 The user clicks on Update button then the System saves the new quantity corresponding to item in the subscription cart.
A.1.3 The updated details appear on the View Cart screen.
A.1.4 The System re-calculates the total cost.
A.1.5 The use case resumes from step 5.
Alternative Flow B: Removing the particular subscription item
B.1.1 The user clicks on the Remove button corresponding the subscription item
B.1.2 The system removes the subscription item from the user's cart.
B.1.3 Removed item is no longer displayed on the View Cart screen.

TABLE 2.1-continued

B.1.4 The System re-calculates the total cost.
B.1.5 The use case resumes from step 5.
Alternative Flow C: Subscribing to only Trial features
This alternative flow is applicable only in case all items in the user's shopping cart are of type 'Trial'.
C.1.1 The user clicks on Checkout button.
C.1.2 The System stores the subscription cart items in the system database and generates the subscription key(s) for each of the selected items.
C.1.3 The System sends the subscription key(s) to the user by email and returns a "success" message to the application for display to the user's browser.
C.1.4 The use case ends successfully
Alternative Flow D: The user clicks on 'Proceed to Checkout' button.
D.1.1 The system redirects to the Payment gateway to process the payment.
D.1.2 See use case 'Proceed to Payment' for details (not shown herein)
D.1.3 This use case ends successfully.
Alternative Flow E: Email cannot be sent to the user
E.1.1 on successful checkout (with or without payment), the system generates subscription keys and invokes the thread for sending email i.e. asynchronously.
E.1.2 The System does not need to inform the user of this condition, but this will be logged in the system log files and the status of the order [in the ORDER table] for this order is updated to "INCOMPLETE" with value "email pending".
E.1.3 The System will asynchronously (for example. via batch processing) resend the email to the user. The batch process can be scheduled to run at a specified frequency (in hours). Default: 6 hours
E.1.4 The use case ends
Exception Flows Exception Flow E1: Payment Gateway is not available
E1.1.1: In alternative flow D 'The user clicks on 'Proceed to Checkout' button, if the system is unable to redirect to the payment gateway for payment processing, thus System displays the error message - "The payment gateway is not available. Please try again later".
E1.1.2: The system displays the message on the 'View Cart' page in the browser.
E1.1.3: The use case resumes at step 5.

The use case documentation provided in Table 2.1 is in a semi structured format and follows a user-defined indexing scheme illustrated in the naming of the steps of the main flow, alternative flow and exception flow. The user-defined convention is typically the result of convenience (style adopted by the user, based on convenience) and not always intuitive to other users of the use case. Further, updating and/or modifying such a use case requires longer time intervals due to the presence of user-defined indexing scheme, which delays the execution of the subsequent steps of the Software Development Life Cycle (SDLC) when the use case is used as the basis for deriving test scenarios and test cases by the Test Designer(s).

Table 2.1 exemplifies a use case having a simpler format/structure which could be created using common document editing softwares such as Microsoft Word Document editor. The aforementioned use case in spite of having a structure lacks clarity, is difficult to understand, and lacks consistent indexing and annotations. The system 10 with reference to FIG. 1 as envisaged by the present disclosure includes an editor 12 which organizes the steps in the use case in accordance with the pre-determined structural format in order to establish a semantic correlation between the steps of the use case. The use cases are thus now available as structured use cases, according to the pre-determined structure comprising main flows, alternative flows and exception flows. Additionally, the use cases in this structured form are indexed using an indexer 14. Table 2.2 exemplifies the use case whose steps have been organized in accordance with the pre-determined structure and indexed to establish the semantic correlation between the steps of the use case.

TABLE 2.2

Actors

Online Shopper (Customer)
Online Shopping web application (i.e. the system)
Preconditions The shopper is authorized and logged-in to the system
The shopper has selected available items/products from the listing
(catalogue) and added these items to the shopping cart/basket and before
proceeding to checkout, clicks the 'View Cart' menu option to review
selected items.
Explanatory note:
Some items may be available for "Try before Buy" i.e. trial or
evaluation items, which may be priced at zero units of currency. A user
may choose a combination of trial and non-trial (that is, paid) items.
Main Flow 1. The View Cart screen is displayed in the user's browser windows,
populated based on the selection of feature details.
The Fields are:
a. Feature Name
b. Subscription Type
c. Unit Period
d. Quantity (No. of Copies)
e. Price
2. If all trial feature details are selected (Total Cost = 0) then Checkout
button will appear.
Else if (Total Cost > 0) Proceed to Checkout button will appear.
3. The screen will provide the following options to for the selected items
in the cart:
a. update the quantity (quantity > 0)
b. remove an item from the cart
4. The user reviews the list of selected items in the shopping cart.
5. If satisfied, the user clicks on the 'Checkout' or 'Proceed to
Checkout' button to process to checkout. Else, the user may update an
item, remove an item or return to select more items (Note: see
alternative flows below for details)
6. The System generates the subscription key.
Explanatory note:
A subscription key is a key to unlock certain items for use by the
shopper, and is generated by the system, once all parts of the purchasing
transaction are validated and authorized.
7. If checkout for trial items is successfully complete, system displays a
confirmation message ("Thank you for your subscription . . . ").
The use case ends successfully.
8. If checkout includes all paid, or a mix of trial and paid items, system
displays a message ("You are being re-directed to the payment gateway
to complete the payment for your transaction . . . ").
The use case continues at the "Proceed to Payment" use case (not shown
herein)
Alternative Flows Alternative Flow A: Updating Particular subscription item
5.1.a: [At step 5 of the main flow,] the user has chosen to update the
item quantity for an item in the shopping cart.
The user selects the new quantity corresponding to the subscription
item.
5.1.b: The user clicks on Update button then the System saves the new
quantity corresponding to item in the subscription cart.
5.1.c: The updated details appear on the View Cart screen.
5.1.d: The System re-calculates the total cost.
5.1.e: The use case resumes from step 5.
Alternative Flow B: Removing the particular subscription item
5.2.a: [At step 5 of the main flow,] the user clicks on the Remove button
corresponding the subscription item
5.2.b: The system removes the subscription item from the user's cart.
5.2.c: Removed item is no longer displayed on the View Cart screen.
5.2.d: The System re-calculates the total cost.
5.2.e: The use case resumes from step 5.
Alternative Flow C: Subscribing to only Trial features
This alternative flow is applicable only in case all items in the user's
shopping cart are of type 'Trial'. [At step 5 of the main flow, if the user
clicks on 'Checkout]
5.3.a: The user clicks on Checkout button.
5.3.b: The System stores the subscription cart items in the system
database and generates the subscription key(s) for each of the selected
items.

TABLE 2.2-continued 5.3.c: The System sends the subscription key(s) to the user by email and
returns a "success" message to the application for display to the user's
browser.
5.3.d: The use case ends successfully
STOP
Alternative Flow D: The user clicks on 'Proceed to Checkout' button.
5.4.a: [At step 5 of the main flow,] The system redirects to the Payment
gateway to process the payment.
5.4.b: See use case 'Proceed to Payment' for details (not shown herein).
5.4.c: This use case ends successfully.
STOP
Alternative Flow E: Email cannot be sent to the user
6.1.a: [At step 6 of the main flow,] on successful checkout (with or
without payment), the system generates subscription keys and invokes
the thread for sending email i.e. asynchronously.
6.1.b: The System does not need to inform the user of this condition, but
this will be logged in the system log files and the status of the order [in
the ORDER table] for this order is updated to "INCOMPLETE" with
value "email pending".
6.1.c: The System will asynchronously (for example, via batch
processing) resend the email to the user. The batch process can be
scheduled to run at a specified frequency (in hours). Default: 6 hours
6.1.d: This use case ends.
STOP
Exception Flow Exception Flow E1: Payment Gateway is not available
5.4.1.a: In alternative flow D 'The user clicks on 'Proceed to Checkout'
button, if the system is unable to redirect to the payment gateway for
payment processing, thus System displays the error message - "The
payment gateway is not available. Please try again later".
5.4.1.b: The system displays the message on the 'View Cart' page in the
browser.
5.4.1.c: This use case resumes at step 5.

Table 2.2 illustrates a structured and indexed use case. The above mentioned indexed use case clearly describes various aspects of the use case document such as the main flow, alternative flow and exception flow amongst others. Moreover, the use case shown in Table 2.2 also includes appropriately indexed items which bring clarity and understandability to the use case. As shown in table 2.2, various process steps depicted in the use case have been appropriately indexed using a number series, and the use case has been structured to enhance the readability and comprehensiveness, as per the pre-determined structure. Further, certain steps in the use case flows have been annotated by keywords like "STOP" to enhance the clarity of the requirements for the expected system's behavior. Such behavior is the subject of the test design that aims to ensure correctness under the stated conditions and scenarios.

In accordance with the present disclosure, the indexed and annotated use case, as exemplified in Table 2.2 is provided as input to the identifier 20. The identifier 20 is adapted to identify the set of all possible combinations of main flow-alternative flow-exception flow steps corresponding to the indexed and annotated use cases. The ordered sets identified by the identifier 20 include at least one main flow, corresponding alternative flow and corresponding exception flow. However, it is possible in some cases that the exception cases may not be present.

The identifier 20 begins processing the use case model typically from a start point defined by the use case. Normally, the order of traversal is initiated with the traversal of the indexed steps corresponding to the main flow of the use case, and as per Table 2.2, the traversal of the use case begins with the traversal of Main Flow which begins with the step of displaying the view cart screen in the user's browser windows. Subsequently, all the steps included in the main flow will be traversed by the identifier 20. Subsequent traversals of the use case are based on the presence of the corresponding alternative flow steps and exception flow steps. If the use case includes any alternative flows corresponding to the main flow, then subsequent to the traversal of the steps of the main flow, the steps corresponding to the alternative flow will be processed. In case of Table 2.2, the described use case includes five alternative flows. Therefore, subsequent to the traversal of the main flow, the steps corresponding to the aforementioned alternative flows would be traversed along with the steps of the main flow to arrive at a candidate test scenario comprising the main flow and the corresponding alternative flows.

For example, a use case with main flow and alternative flows could be traversed in such a manner that the corresponding candidate test scenario includes the following sets of steps:

Set 1: {1,2,3,4,5,6,7,8-END}, wherein steps 1,2,3,4, . . . 8 correspond to the steps in the main flow (this ordered set represents the normal flow); and {1,2,3,4,5.1.a, 5.1.b, 5.1.c, 5.1.d, 5.1.e-STOP}, wherein steps 1,2,3 and 4 correspond to the steps in the main flow and step 5.1.x corresponds to the alternative flow (this ordered set represents the combination of normal flow and corresponding alternative flow).

For example, another candidate test scenario could include the following set of steps:

Set 2: {1,2,3,4,5,6,7,8-END}, wherein steps 1,2, 3,4,5,6, 7, and 8 correspond to the steps in the main flow; and {1,2,3,4,5.2.a, 5.2.b, 5.2.c, 5.2.d, 5.2.e, 6, 7, 8.-END}, wherein steps 1,2,3,4,6,7 and 8 correspond to the steps in the main flow and steps 5.2.x corresponds to the alternative flow;

In accordance with this disclosure, set 1 and set 2 correspond to the possible candidate test scenarios generated by traversing the main flow and corresponding alternative flows. It is to be noted that for the sake of explanation only two sets of identified test scenarios are illustrated here. However, for the aforementioned exemplary use case, the number of test scenarios that can be identified will be up to '11', and all the possible test scenarios have not been explained for the sake of brevity.

Further, the test scenarios thus identified can be easily verified and validated by the test designer, to ensure a valid scenario. For example, if a test scenario was identified as having the steps {1,2,3,4,5.4.a,5.4.b,5.4.c,6,7,8-END} instead of the purported set {1,2,3,4,5.4.a,5.4.b,5.4.c-STOP}, then such an event can be noted as an error or as an invalid test scenario in the input case. Identifying such inconsistencies/errors early in the software development lifecycle is a tremendous advantage and can lead to benefits in terms of time and effort saved.

Subsequent to the traversal of the main flow and alternative flows, if it is determined by the identifier 20 that exception flows corresponding to one or more steps of the main flow are included in the use case, then the step(s) corresponding to the exception flows would be traversed. In case of the use case depicted in Table 2.2 one exception flow (E1) has been provided. Therefore, the steps corresponding to the sole exception flow would be processed by the identifier 20 subsequent to the traversal of the main flow and the alternative flows.

In accordance with the present disclosure, the order of steps of the use case pertaining to a candidate test scenario is determined based on the index associated with the respective steps. For example, in Table 2.2, the $5^{th}$ step of the main flow reads "if satisfied, the user clicks on the 'Checkout' or 'Proceed to Checkout' button to process to checkout. Else, the user may update an item, remove an item or return to select more items." Now the steps of the alternative flow corresponding to the 5th step of the main flow are identified as alternative flow A (having steps indexed as 5.1.a to 5.1.e), alternative flow B (having steps indexed as 5.2.a to 5.2.e), alternative flow C (having steps indexed as 5.3.a to 5.3.d) and alternative flow D (having steps indexed as 5.4.a to 5.4.c). Such an identification of the alternative steps corresponding to a particular main step is performed by the identifier 20 based on the index associated with the steps of the alternative flow. Subsequently, the steps of the exception flow E1 have been indexed as 5.4.1.a to 5.4.1.c, since those steps correspond to the 5.sup.th step of the main flow and fourth alternative flow (alternative flow: D). Therefore the steps have been indexed starting from 5.4.1.a with '5' representing the corresponding main flow step, '4' representing the corresponding alternative flow, and 'La' representing the first step of the exception flow.

In accordance with the present disclosure, since steps of alternative flows A, B, C and D and exception flow E1 have been indexed beginning with the numerical 5 (in the format 5.x.x), the identifier 20 identifies that these steps correspond to the $5^{th}$ step of the main flow. Subsequently, the steps identified by the identifier 20 will be arranged in terms of an ordered set (order involving a particular step of the main flow, all the steps of the alternative flows which have identified as related to the particular steps of the main flow and all the steps of the exception flows which have been identified as related to the particular step of main flow) so as to represent a meaningful flow.

In the aforementioned manner, the identifier 20 identifies all the possible ordered sets in which the steps associated with the use case can be assembled. The test scenario generator 22 which is adapted to generate test scenarios having indexed and annotated steps cooperates with the identifier 20 and generates test scenarios having indexed steps arranged according to the order identified by the identifier 20. The test scenario generator 22 acts as a consistent and reliable part for identifying and generating the possible test scenarios from the use case. The test scenarios thus identified are available to the test designer/analyst to proceed with the next stage of test designing, and may be exported into a convenient format such as Microsoft Excel spreadsheet.

By use of the system and method envisaged by the present disclosure, a comprehensive set of test scenarios comprising combinations of path traversals in a use case containing main flows, alternative flows and exception flows can be generated. The disclosure enables the creation of test scenarios from structured, indexed and annotated use cases in an extremely rapid manner, and in a repeatable and consistent fashion. This ensures maximum coverage of the use case paths, and increases the overall efficiency of operation of the Test Designer, in the test design phase. The focus of the Test Designer now shifts to selecting the applicable test scenarios—based on a prioritization—for inclusion in the scope of the overall testing cycle. The validation of the created test scenarios is also easier and quicker since it is easy for the reviewers to confirm the need for considering an identified test scenario for the purpose of software testing. The system of the present disclosure also depicts the structured and indexed use case in a lucid form that a novice user can also easily understand. Thus, the overall efficiency of the process of understanding the complex use case, comprising multiple alternative and exception flows and deriving the optimal set of test scenarios there from is increased significantly.

In at least one of the embodiments, the system envisaged by the present disclosure:

enables storing of generated test scenarios in a repository;

handles more complex use case constructs, such as use cases with alternative-flows for alternative flows, exception flows for alternative flows, and the like;

provides a way for facilitating concurrent indexing and organization of steps while editing the use case;

provides a way which suggests the type of the flow (i.e., the main flow, alternative flow or exception flow) being edited; and provides a way to additionally identify parameters such as input/output values, expected results, etc. for test cases corresponding to the identified test scenarios.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps. The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form part of the prior art base or were common general knowledge in the field relevant to the disclosure as it existed anywhere before the priority date of this application.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

While considerable emphasis has been placed herein on the particular features of this disclosure, it will be appreciated that various modifications can be made, and that many changes can be made in the preferred embodiment without departing from the principles of the disclosure. These and other modifications in the nature of the disclosure or the preferred embodiments will be apparent to those skilled in the art from the disclosure herein, whereby it is to be distinctly understood that the foregoing descriptive matter is to be interpreted merely as illustrative of the disclosure and not as a limitation.

What is claimed is:

1. A computer implemented system for indexing and annotating steps associated with use cases and generating test scenarios therefrom, said system comprising:
    a processor;
    a memory coupled to the processor for indexing and annotating the steps associated with the use cases and generating the test scenarios using at least one of a pre-configured rule set and a user configurable rule set;
    a use case model creator creating at least one in-memory use case model of said use cases and store the use case model in said memory;
    a pre-determined structural format for said use cases stored in said memory;
    an editor organizing the steps associated with said use cases in the in-memory use case model according to the pre-determined structural format only in the event that said steps do not adhere to the pre-determined structural format;
    an indexer indexing the steps that adhere to the pre-determined structural format and the steps organized according to said pre-determined format;
    an annotation processor annotating the indexed steps in each of said use cases by inserting appropriate keywords into at least one of said indexed steps;
    a generator receiving the use cases having indexed steps with or without annotation, said generator comprising:
        an extractor extracting said indexed steps from said use cases in the in-memory use case model;
        an identifier identifying at least one ordered set in which said indexed steps is assembled, wherein said ordered set includes at least one flow selected from a group of flows consisting of main flow, alternative flow and exception flow;
        a test scenario generator generating at least one test scenario having the ordered indexed steps arranged according to the order identified by said identifier, said test scenario generator further validating the generated at least one test scenario based on a pre-determined validation criterion; and
        a comparator comparing the generated at least one test scenario based on the order of the corresponding indexed steps, said comparator further eliminating the test scenario having an ordered set identical to that of another generated test scenario.

2. The system as claimed in claim 1, further comprising an exporter exporting at least the generated at least one test scenario including the validated test scenario into a test environment.

3. A computer implemented method for indexing and annotating steps associated with use cases and generating test scenarios therefrom, said method comprising:
    providing a computerized processing system comprising a memory coupled to a processor for indexing and annotating the steps associated with the use cases and generating the test scenarios using at least one of a pre-configured rule set and a user configurable rule set;
    creating at least one in-memory use case model from the user provided use case input and storing the use case model in said memory;
    re-arranging the steps associated with said use case model corresponding to the use cases according to a pre-determined structural format only in the event that said steps do not adhere to said pre-determined structural format;

indexing the steps that adhere to said pre-determined structural format and the steps re-arranged according to said pre-determined structural format;

annotating the indexed steps in each of said use cases in the in-memory use case model by inserting appropriate keywords into at least one of the said indexed steps;

receiving the use cases in the in-memory use case model having indexed steps and extracting said indexed steps from said use cases;

identifying at least one ordered set in which said indexed steps is assembled;

generating at least one test scenario having the assembled and ordered indexed steps arranged according to the identified order;

validating generated the at least one test scenario based on a pre-determined validation criterion; and comparing the generated at least one test scenario based on the order of corresponding indexed steps and eliminating the test scenario having an ordered set identical to that of another generated test scenario.

4. The method as claimed in claim 3, wherein identifying at least one ordered set further includes identifying an ordered set having at least one flow selected from a group of flows consisting of main flow, alternative flow and exception flow.

5. The method as claimed in claim 3, further comprising exporting at least the generated at least one test scenario including the validated test scenario into a test environment.

6. The system as claimed in claim 1, wherein the test scenario generator is automatically generating the at least one test scenario having the ordered indexed steps.

7. The method as claimed in claim 3, wherein the at least one test scenario having the assembled and ordered indexed steps is automatically generated.

8. A computer implemented system for indexing and optionally annotating steps associated with use cases and automatically generating test scenarios therefrom, said system comprising:

a processor; and a memory that stores a computer executable program and a pre-determined structural format, wherein when the computer executable program is executed, the processor performs the functions to:

organize the steps associated with said use cases according to the pre-determined structural format only in the event that said steps do not adhere to the pre-determined structural format;

index the steps that adhere to the pre-determined structural format and the steps organized according to said pre-determined format;

optionally annotate the indexed steps in each of said use cases by inserting appropriate keywords into at least one of said indexed steps;

receive use cases having the indexed steps and extract said indexed steps from said use cases;

identify at least one sequence in which said indexed steps is traversed, wherein said at least one sequence includes at least one of main flow, alternative flow and exceptional flow;

automatically generate at least one test scenario having said indexed steps arranged according to the at least one sequence and optionally filter generated test scenarios based on a pre-determined filtering criterion; and compare the generated test scenarios based on the sequence of the corresponding indexed steps and eliminate the test scenario having a sequence identical to that of another generated test scenario.

9. The system as claimed in claim 6 wherein the processor further performs a function to export at least the generated test scenarios including filtered test scenarios into a test environment.

* * * * *